United States Patent
Pratt et al.

[19]

[11] Patent Number: 6,166,506
[45] Date of Patent: Dec. 26, 2000

[54] WIRELESS SAFETY CLUTCH

[75] Inventors: Kenneth K. Pratt, Tecumseh, Canada; Randall Stevens, Livonia, Mich.

[73] Assignee: Tregaskiss, Ltd., Oldcastle, Canada

[21] Appl. No.: 09/329,518

[22] Filed: Jun. 10, 1999

Related U.S. Application Data

[60] Provisional application No. 60/089,843, Jun. 19, 1998.

[51] Int. Cl.[7] .................................................. G05B 19/00
[52] U.S. Cl. ................................ 318/568.12; 318/568.18; 318/568.1; 219/124.34; 901/42; 901/43
[58] Field of Search ..................................... 318/560–696; 345/156, 157; 356/375, 152.1, 372; 175/45; 342/448, 459; 701/50, 23, 25, 27; 395/86; 43/17; 219/124.34, 124.1, 125.12; 901/41, 42, 43; 33/503, 546; 364/424.02; 414/744.3, 744.6, 744.8

[56] References Cited

U.S. PATENT DOCUMENTS

| | | | |
|---|---|---|---|
| 4,090,802 | 5/1978 | Bilz | 408/6 |
| 4,401,345 | 8/1983 | Archibald | 299/64 |
| 4,634,947 | 1/1987 | Magori | 318/568 |
| 4,638,231 | 1/1987 | Monforte | 318/640 |
| 4,682,182 | 7/1987 | Oyama et al. | 346/1.1 |
| 4,761,101 | 8/1988 | Zettl | 408/6 |
| 4,789,034 | 12/1988 | Luchinger et al. | 177/181 |
| 4,920,520 | 4/1990 | Gobel et al. | 367/99 |
| 5,001,635 | 3/1991 | Yasutomi et al. | 364/424.02 |
| 5,017,084 | 5/1991 | Lemelson | 414/744.3 |
| 5,140,239 | 8/1992 | Matsuura | 318/571 |
| 5,182,714 | 1/1993 | Matsuura | 364/474.03 |
| 5,247,233 | 9/1993 | Matsuura et al. | 318/570 |
| 5,307,271 | 4/1994 | Everett et al. | 364/424.02 |
| 5,345,687 | 9/1994 | Matsuura et al. | 33/503 |
| 5,495,090 | 2/1996 | Mukai et al. | 219/124.34 |
| 5,581,930 | 12/1996 | Langer | 43/17 |
| 5,908,458 | 6/1999 | Rowe et al. | 701/50 |
| 6,035,951 | 3/2000 | Mercer et al. | 175/45 |
| 6,043,890 | 3/2000 | Spink et al. | 356/375 |
| 6,046,727 | 4/2000 | Rosenberg et al. | 345/156 |

*Primary Examiner*—Paul Ip
*Attorney, Agent, or Firm*—Fildes & Outland, P.C.

[57] ABSTRACT

A robotic safety clutch that provides a wireless connection between the safety clutch and an robotic/automatic arm controller. The safety clutch includes a sensor for sensing a crash event and a radio frequency transmitter for transmitting a crash signal in response to the sensed crash event to a radio frequency receiver. The radio frequency receiver is connected to the robotic/automatic arm controller. Upon receiving the crash signal from the transmitter, the receiver sends a crash signal to the controller and in response to the crash signal, the controller shuts down all robotic/automatic functions.

3 Claims, 3 Drawing Sheets

WIRELESS SAFETY CLUTCH

CROSS REFERENCE TO RELATED APPLICATIONS

This application claims the benefit of U.S. Provisional Application No. 60/089,843, filed Jun. 19, 1998.

FIELD OF THE INVENTION

This invention relates to a safety clutch for robotic/automatic application and, more particularly, to a wireless robotic safety clutch that eliminates hard wiring from the clutch to controller.

BACKGROUND OF THE INVENTION

Conventional safety clutch models incorporate a sensing device, such as a switch, which provides a signal to a controller. The safety clutch is designed to protect a robot or automatic motion device, welding torch or other mounted device, mounting arm, and fixtures from damage in the event of an end of robotic/automatic arm crash. Typically, the safety clutch senses movement in the end of arm mounted equipment, and in the case of a crash, shuts down all robotic/automatic functions.

A hard-wired cable extending from the clutch to the controller for the robotic/automatic arm provides the path for the sensing signal sensed by the safety clutch. This hard-wired cable can be easily damaged due to weld spatter, catching on fixtures or equipment, constant flexing and normal wear and tear.

SUMMARY OF THE INVENTION

The present invention provides a wireless robotic safety clutch that eliminates the hard-wired cable path between the safety clutch and robotic/automatic arm controller.

Accordingly, the wireless robotic safety clutch includes a crash sensor for sensing a crash event and a radio frequency transmitter for transmitting a crash signal in response to the sensed crash event to a radio frequency receiver. The radio frequency receiver is connected with the robotic/automatic arm controller. Upon receiving the crash signal from the transmitter, the receiver sends a crash signal to the controller and in response to the crash signal, the controller shuts down all robotic/automatic functions.

In one embodiment of the invention, the transmitter includes a housing that encloses a transmitter circuit. The transmitter circuit includes an encoder, modulator, antenna, low battery switch, wire feed jog switch, test receiver switch and the crash sensor. The encoder is connected between the modulator and the low battery switch, test receiver switch, wire feed jog switch and the sensor to encode the data signal received from the various switches into a serial data signal to be modulated upon the antenna.

Upon activation of the wire feed jog switch, the transmitter sends a wire feed signal to the receiver. In response to receiving the wire feed signal, the receiver sends a wire feed signal to the controller and the controller activates a wire feeder to supply wire through the welding torch.

The test receiver switch is provided to enable the operator to test whether the transmitter and receiver are properly communicating with each other. When the test receiver switch is activated, the transmitter sends a test signal to the receiver and in response the receiver will turn on a test light-emitting diode (LED) if it received the signal from the transmitter.

The low battery switch is activated when the battery of the transmitter falls below a certain voltage level. A low battery LED located on the transmitter will turn on to indicate that the battery needs to be replaced. Further, the transmitter sends a low battery signal to the receiver and in response the receiver turns on a low battery LED located on the receiver and sounds a buzzer located within the receiver, signaling to the operator that the battery needs to be changed.

These and other features and advantages of the invention will be more fully understood from the following detailed description of the invention taken together with the accompanying drawings.

DETAILED DESCRIPTION OF THE INVENTION

Figure 1:
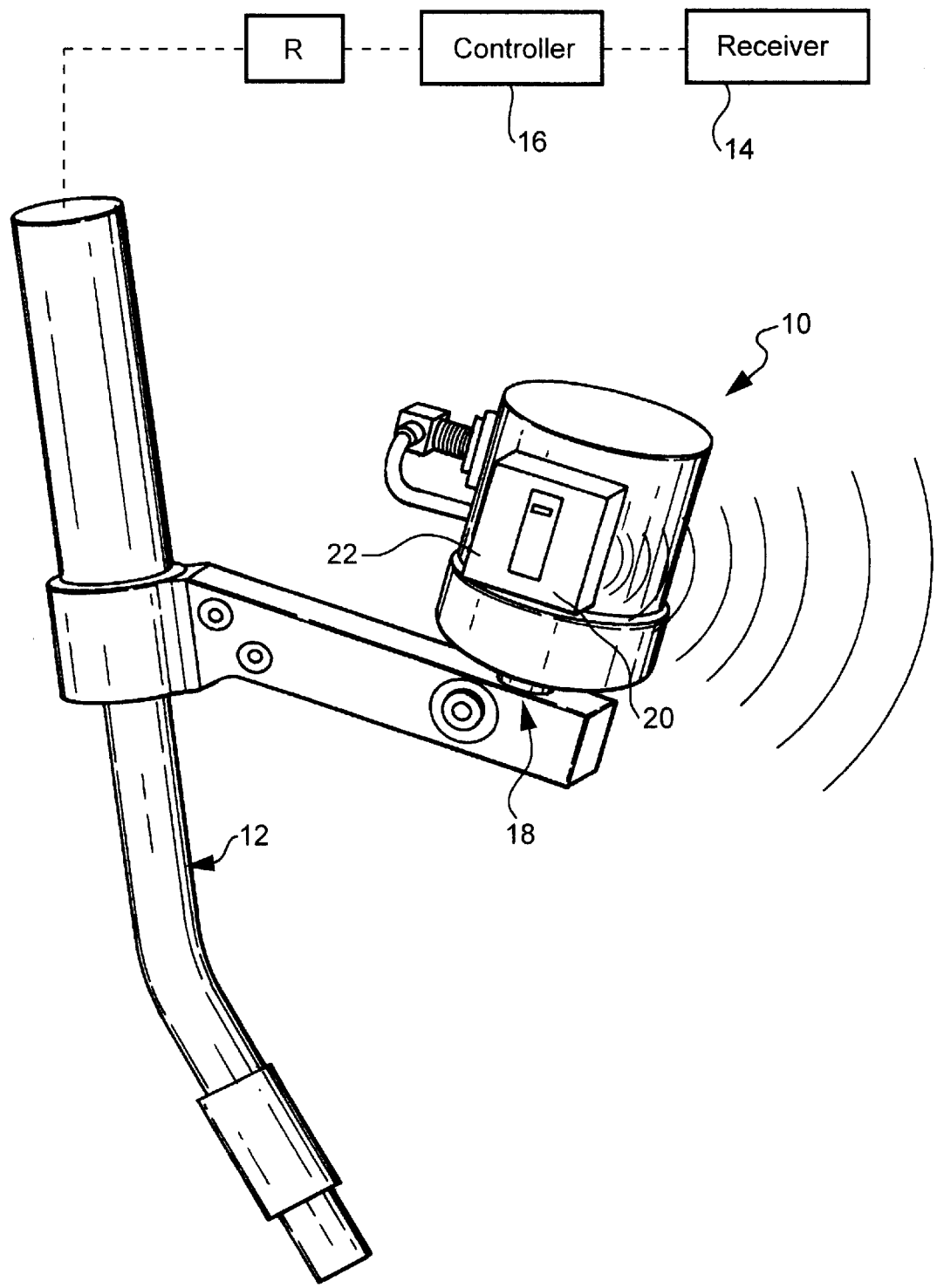
FIG. 1 is a schematic illustration of a wireless robotic safety clutch constructed in accordance with the present invention and mounted on a robotic welding torch.
Figure 2:
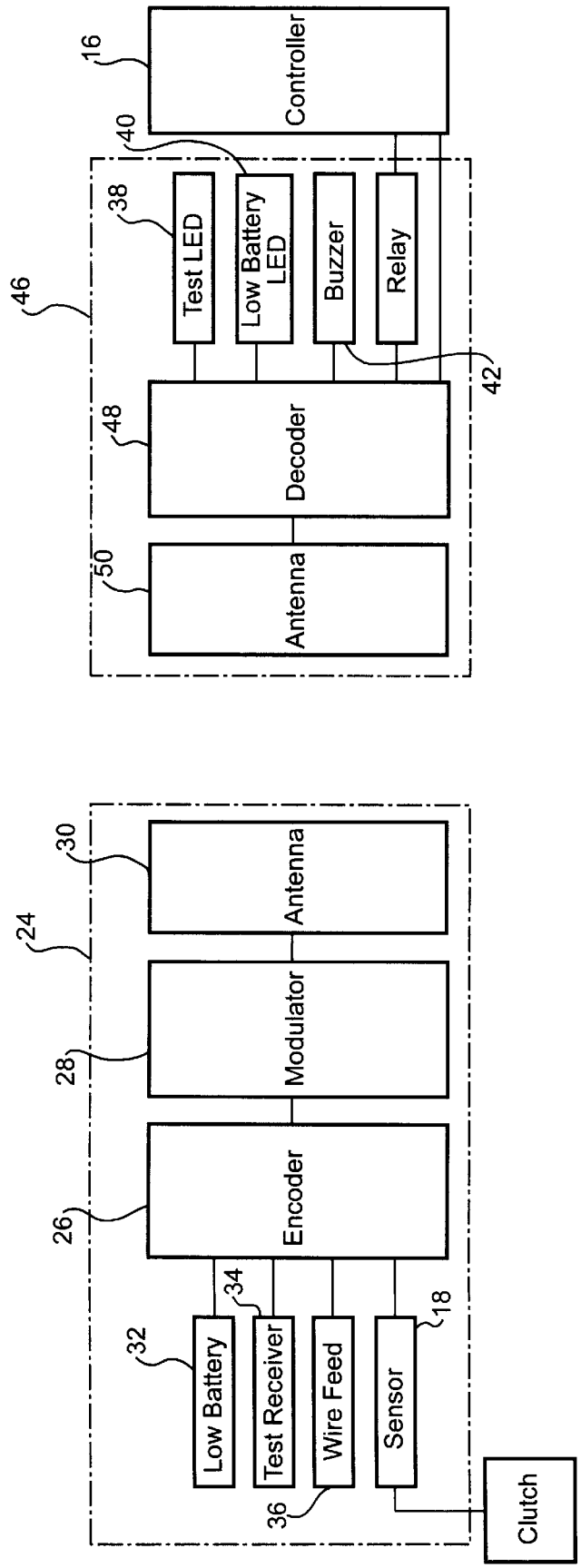
FIG. 2 is a schematic circuit diagram of the wireless robotic safety clutch.

Referring to FIGS. 1 and 2, there is shown a wireless robotic safety clutch 10 that is used to protect a robot R or automatic motion device in the event of a crash, communicating a wireless crash signal for shutting down all robotic/automatic functions. As is hereinafter more fully described, the safety clutch 10 is mounted one the end of arm equipment, such as a welding torch 12 shown, and senses any movement of the equipment arm.

In the case of a crash, the clutch 10 transmits a radio frequency wave to a receiver 14 in communication with a controller 16 that controls the robot R and discontinues operation of the robot.

The safety clutch 10 includes a crash sensor 18 for sensing a crash event connected to a radio frequency transmitter 20 for transmitting a crash signal in response to the crash event occurring. The sensor 18 may be a microswitch. The microswitch is in a closed position when the equipment arm is working properly and is in a open position when a crash event occurs. The transmitter 20 sends a RF signal, or crash signal, to the receiver 14 indicating that a crash event has occurred and in response the receiver opens a relay or other such device to send a crash signal to the robotic controller to immediately shutdown the robotic operations.

The transmitter 20 is mounted on the safety clutch 10. The transmitter 20 includes a housing 22 that encloses a transmitter circuit 24 for transmitting RF modulated signals to the receiver 14. The transmitter 20 is powered by a battery such as a +12-volt alkaline battery. In one embodiment of the present invention, the transmitter circuit 24 includes an encoder 26, modulator 28, antenna 30, low battery switch 32, test receiver switch 34, wire feed jog switch 36 and the crash sensor 18. The low battery switch 32, test receiver switch 34, wire feed jog switch 36 and the crash sensor 18 are applied to the inputs of the encoder 28 and the output of the encoder 26 is applied to the modulator 28. The encoder 26 encodes the input data signals received from the various switches into a serial data signal to be modulated upon the antenna 30.

The test receiver switch 34 may be a push button mounted on the outside of the housing 22. The test receiver switch 34 allows the operator to test whether the transmitter 20 and receiver 14 are properly communicating with each other. When the test receiver switch 34 is pushed, the transmitter 20 sends a test signal to the receiver 14. If the receiver 14 receives the test signal, the receiver 14 turns on a test light-emitting diode (LED) 38 located on the outside of the receiver 14 for a certain period of time, such as 30 seconds, indicating that the test signal from the transmitter 20 has been successfully received.

The wire feed jog switch 36 may be a push button mounted on the outside of the housing 22. When the feed jog switch 36 is pushed, the transmitter 20 sends a wire feed signal to the receiver 14. In response to the wire feed signal, the receiver 14 closes a relay or other such device to produce a wire feed signal to be sent to the robotic controller 16 indicating the need to activate a wire feeder to supply wire through the welding torch.

The low battery switch 32 is connected to a low battery LED mounted on the outside of the housing 22. If the voltage of the transmitter battery drops below +11 volts dc, the low battery LED on the transmitter 20 will flash once every 30 seconds to indicate that the battery is in need of replacement. In addition, the transmitter 20 sends a RF signal to the receiver 14 which will also flash a low battery LED 40 located on the outside of the receiver 14 and sound a piezo buzzer 42 within the receiver 14 to indicate that the battery needs replacing. Further, two terminals in conjunction with the piezo buzzer 42 and low battery LED 40 may be provided to allow the connection of other external low battery warning devices. To ensure that the battery is changed, the only way to turn off the low battery LED 40, the buzzer 42 and/or the external warning devices is to install a new battery and press the test receiver switch 34.

Receiver 14 is mounted and wired to the robotic/automatic arm controller 16, which may be as far as 25–30 feet from the welding cell. The receiver 14 has four channels to receive the wire feed signal, battery low signal, test signal and the crash signal. The receiver 14 includes a housing 44 that encloses a receiver circuit 46. The receiver circuit 46 includes a decoder 48, antenna 50, test LED 38, low battery indicator 40 and the piezo buzzer 42. The decoder 48 decodes and analyzes the RF modulated signal from the transmitter 20 and sends the appropriate output to the robotic/automatic arm controller 16. The antenna 50 is preferably a circular type antenna for multi directional RF signal pick up.

Figure 3:
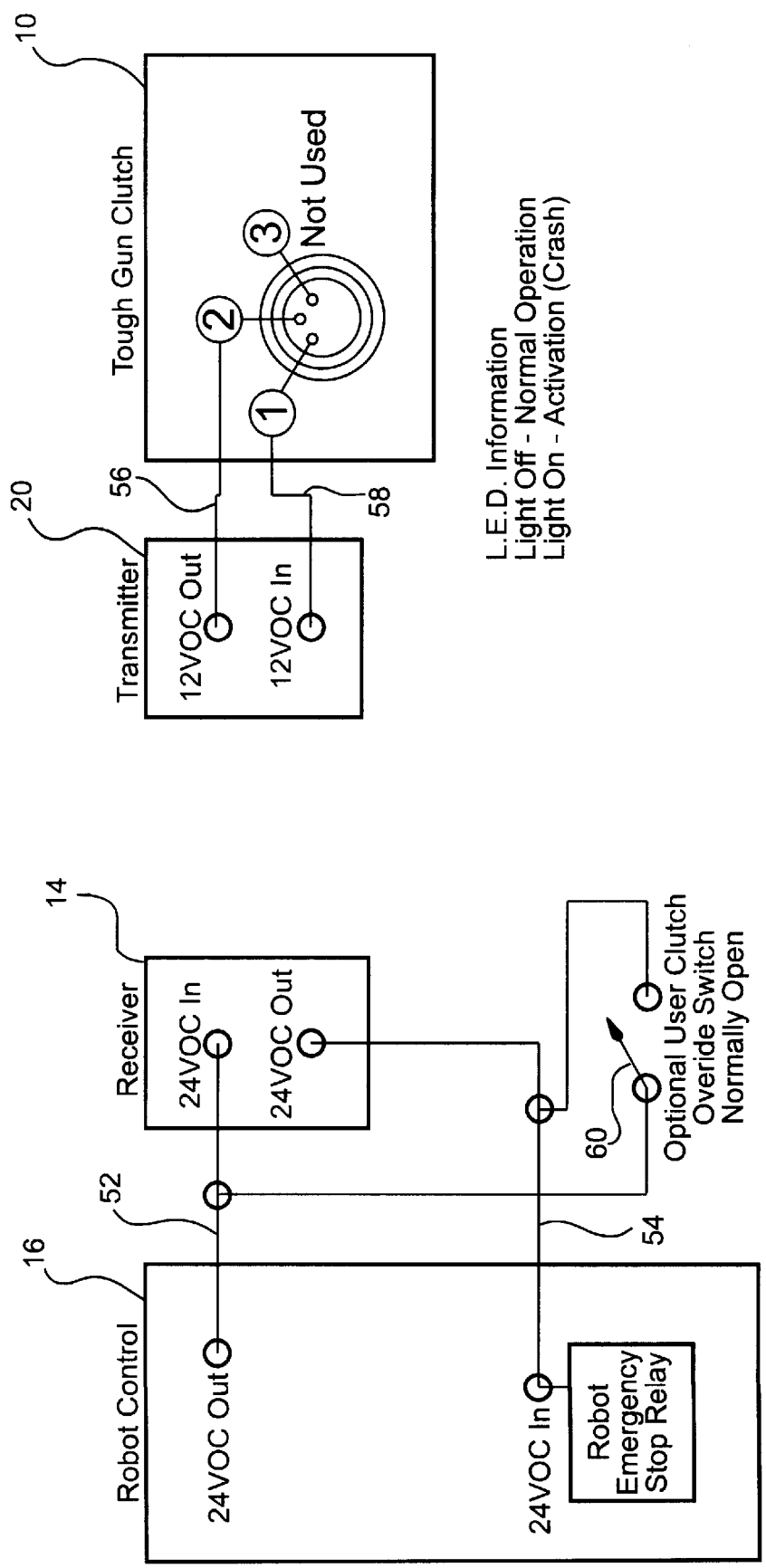
FIG. 3 is a wiring diagram of the wireless robotic safety clutch.

In FIG. 3 there is illustrated the wiring for the safety clutch 10, transmitter 20, receiver 14 and controller 16. The receiver 14 is powered by +24 volts dc supplied by the robotic controller 16 across signal lines 52 and 54. The transmitter 20 is connected to the clutch across lines 56 and 58. Additionally, a manual override clutch switch 60 may be provided to manually stop the robotic functions. The override clutch switch 60 is connected across signal lines 52 and 54 and is normally in an open position and is in a closed position when the switch 60 is activated.

A method for disabling a robotic/automatic motion device in the event of a crash event includes the following steps. The crash event is sensed by a crash sensor which generates a crash signal in response to the sensed crash. The crash signal is transmitted from a radio frequency transmitter and is received by a radio frequency receiver. The robotic/automatic motion device is disabled in response to the radio frequency receiver receiving the crash signal.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A wireless robotic collision sensor for a robotic/automatic motion device comprising:

a crash sensor for sensing a crash event;

a radio frequency transmitter for transmitting a crash signal in response to the sensed crash event;

said sensor and transmitter being mounted on a welding torch, and a radio frequency receiver for receiving said crash signal transmitted by said transmitter;

said receiver electrically connected to a controller of said robotic/automatic motion device;

said transmitter including a housing enclosing a transmitter circuit;

said transmitter circuit comprising:

a low power switch activated when the power supply of the transmitter falls below a predetermined level and upon activation of the low power switch a low power signal is produced to be transmitted to the receiver;

a test receiver switch to allow the operator to test whether the receiver and transmitter are properly communicating and upon activation of the test receiver switch a test signal is produced to be transmitted to the receiver;

a wire feed jog switch to activate a wire feeder to supply wire through the welding torch and upon activation of the wire feed jog switch a wire feed signal is produced to be transmitted to the receiver;

an encoder for converting multiple inputs into a single output, said low power switch, test receiver switch, wire feed switch and the crash sensor are applied to the inputs of the encoder;

a modulator for modulating the output signal of the encoder; and a transmitter antenna for transmitting the modulated output signal of the encoder to the receiver;

whereby said controller disables said robotic/automatic motion device upon receipt of the crash signal by said receiver.

2. A collision sensor as in claim 1 wherein the receiver includes a housing enclosing a receiver circuit, said receiver circuit comprising:

a receiver antenna for receiving the signal from the transmitter;

a decoder for converting the transmitted signal received by the antenna into a multiple of output lines;

a low power indicator that is activated when the receiver receives the low power signal from the transmitter;

a test indicator that is activated when the receiver receives the test signal from the transmitter, indicating that the transmitter and receiver are properly communicating with each other; and a wire feed switch that is activated when the receiver receives the wire feed signal from the transmitter and is electrically connected to the controller which activates a wire feeder in response to receiving the wire feed signal to supply wire through the welding torch.

3. A method for disabling a robotic/automatic motion device in the event of a crash event, the method comprising the steps of:

providing a sensor for sensing a crash event;

mounting said sensor on a welding torch fitted on said robotic/automatic motion device;

providing a radio frequency transmitter for transmitting signals in response to selected crash information;

providing a radio frequency receiver for receiving said signals transmitted by said transmitter;

providing a housing enclosing a transmitter circuit comprising:

- a low power switch activated when the power supply of the transmitter falls below a predetermined level and upon activation of the low power switch a low power signal is produced;
- a test receiver switch to allow the operator to test whether the receiver and transmitter are properly communicating and upon activation of the test receiver switch a test signal is produced to be transmitted to the receiver;
- a wire feed jog switch to activate a wire feeder to supply wire through the welding torch and upon activation of the wire feed jog switch a wire feed signal is produced to be transmitted to the receiver;
- an encoder for converting multiple inputs into a single output, said low power switch, test receiver switch, wire feed switch and the crash sensor are applied to the inputs of the encoder;
- a modulator for modulating the output signal of the encoder; and
- a transmitter antenna for transmitting the modulated output signal of the encoder to the receiver; and combining said receiver with a controller of said robotic/automatic motion device;

whereby said controller disables said robotic/automatic motion device upon receipt of signals by said receiver.

* * * * *